Feb. 5, 1957  L. BREDENSTEINER ET AL  2,780,487
BALED HAY FORK

Filed June 14, 1954  2 Sheets-Sheet 1

INVENTORS
Lee Bredensteiner,
& Sterling Simmons
BY Victor J. Evans & Co.
ATTORNEYS

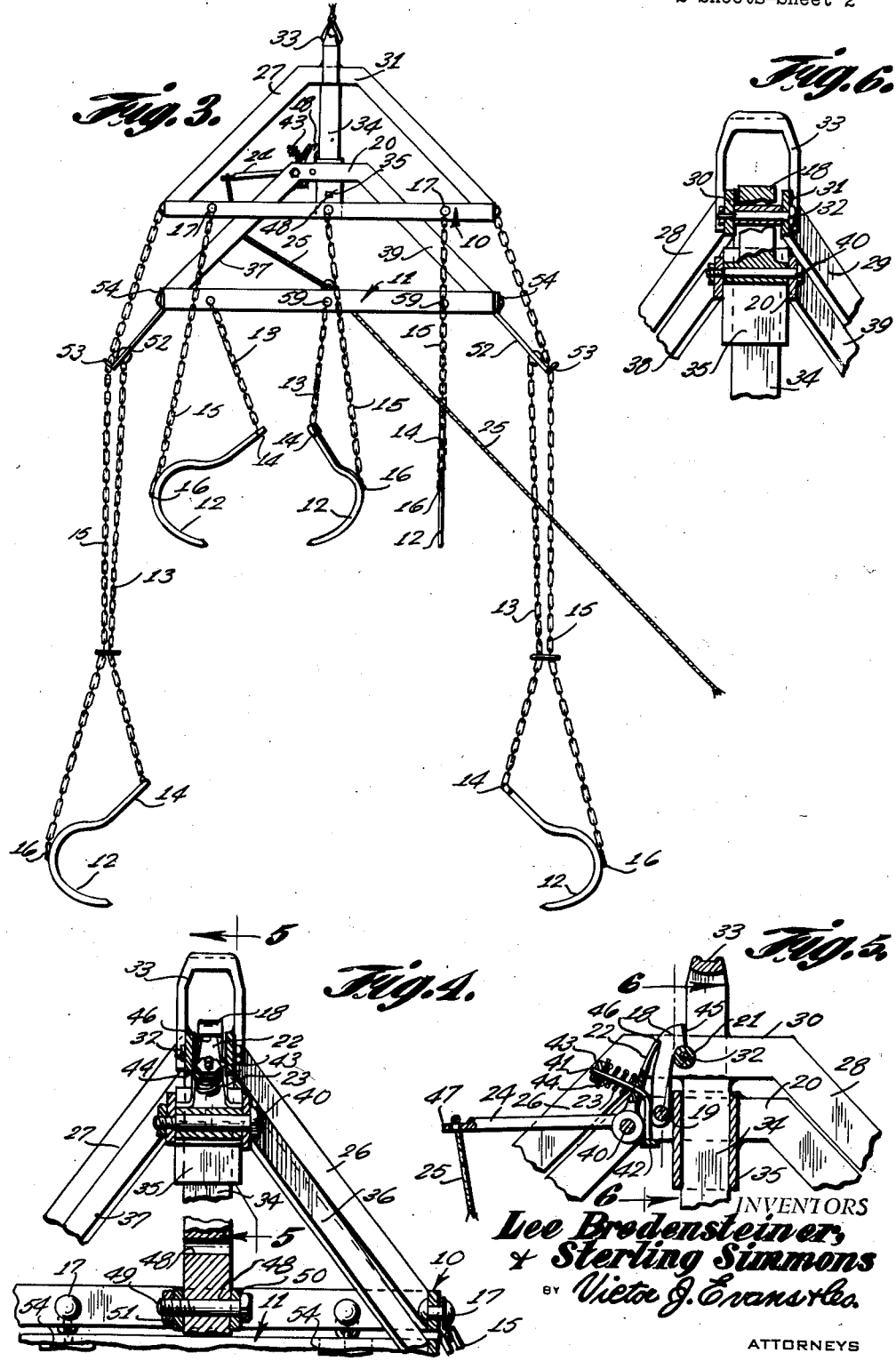

United States Patent Office 2,780,487
Patented Feb. 5, 1957

2,780,487
BALED HAY FORK

Lee Bredensteiner and Sterling Simmons, Shenandoah, Iowa

Application June 14, 1954, Serial No. 436,591

4 Claims. (Cl. 294—67)

This invention relates to devices for picking up and carrying baled hay, and in particular, a forked structure comprising upper and lower rectangular-shaped frames with a latch for retaining the frames in the closed position and with hooks, each being adapted to carry a bale of hay, suspended by chains from the frames with chains extended from the lower frame connected to the ends of shanks of the hooks and with chains extended from the upper frame connected to backs of the hooks whereby upon separation of the frames, with the lower frame dropping downwardly, the shanks of the hooks are released so that the hooks are drawn from bales of bay by the chains attached to the backs thereof.

The purpose of this invention is to provide a fork for picking up, carrying, and depositing bales of hay wherein hooks manually inserted in bales of hay are adapted to hold the bales until drawn from the bales by chains attached to the backs of the hooks.

Various types of grappling hooks have been provided for carrying hay from trucks and the like into barns for storage, however, such devices are not adapted to carry baled hay and with substantially all hay baled in the field it is desired to provide a fork for readily picking up bales of hay and conveying the bales on the barn track carrier to storage areas within the barn. With this thought in mind, this invention contemplates a pair of frames having upwardly extended framework with the framework of the lower frame being nested in the framework of the upper frame and with the frames retained in nested relation with a latch, a clevis positioned on the upper end of a strut carried by the upper frame and slidable through the framework of the lower frame, and hooks suspended by chains from the lower frame and being adapted to be actuated to release bales of hay carried thereon with chains attached to the backs of the hooks and to the upper frame.

The object of this invention is, therefore, to provide mounting and actuating means for hooks wherein each hook is adapted to carry a bale of hay in which the device is adapted to be attached to the pulley of a barn track carrier and in which the device is adapted to be actuated to release the hooks from the bales of hay carried thereby.

Another object of the invention is to provide a baled hay fork that is adapted to be used in combination with conventional hay-carrying hoists and that is adapted to carry a plurality of bales of hay.

A further object of the invention is to provide a baled hay fork having a plurality of hooks with each hook adapted to carry a bale of hay and with each hook also provided with actuating means for releasing a bale of hay therefrom in which the fork is of a simple and economical construction.

With these and other objects and advantages in view, the invention embodies a pair of rectangular-shaped frames with bars extended inwardly and upwardly from the corners in which a latch is provided for retaining the frames in closed relation and in which hooks are suspended by chains from the frames.

Other features and advantages of the invention will appear from the following description taken in connection with the drawings, wherein:

Figure 3 is a side elevational view similar to that shown in Figure 2 showing the device with the frames separated in which position the hooks are drawn from bales of hay.

Figure 4 is a detail taken on line 4—4 of Figure 2, showing the latching elements for retaining the frames in closed position, the parts being shown on an enlarged scale.

Figure 5 is a side elevational view of the latching elements being taken on line 5—5 of Figure 4 and the device being shown with parts broken away.

Figure 6 is a detail showing a section taken on line 6—6 of Figure 5 illustrating the mounting of the latch and also with parts broken away.

Figure 1:
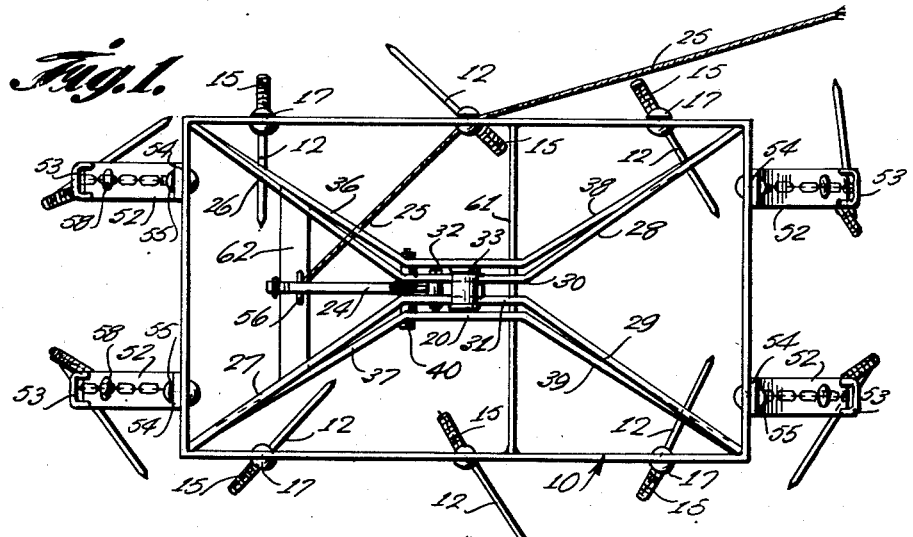
Figure 1 is a plan view of the improved baled hay fork.

Referring now to the drawings wherein like reference characters denote corresponding parts, the baled hay fork of this invention includes an upper frame 10, a lower frame 11, hooks 12 suspended from the lower frame with chains 13 which are attached to eyes 14 at the upper ends of shanks of the hooks and which are adapted to be actuated by chain members 15 attached to points 16 on the backs of the hooks and to the upper frame 10 with rivets 17, and a latch 18 pivotally mounted by a pin 19 in an upper section 20 of the lower frame and retained in latching relation with a roller 21 of the upper frame by a trigger 22 that is resiliently held by a spring 23 and that is provided with an arm 24 to which a trip cord 25 is connected.

The upper frame 10 is provided with a framework having upwardly extended bars 26 and 27 extended from the corners of one end and similar bars 28 and 29 extended from the corners of the opposite end and, particularly as shown in Figure 1, the bars 26 and 28 are connected with a horizontally disposed bar 30 and the bars 27 and 29 by a similar bar 31.

The roller 21 is rotatably mounted on a pin 32 extended through the bars 30 and 31 and, as illustrated in Figure 5, the latch 18 is adapted to snap over the roller 21 to retain the frames in nested relation, in which position the hooks are adapted to carry bales of hay.

A clevis 33 is also secured to the bars 30 and 31 and a strut 34, also secured to the bars 30 and 31, extends downwardly through a sleeve 35 in the section 20 formed by horizontally disposed sections of upwardly extended bars of the lower frame 11.

The upwardly extended bars of the lower frame 11 include sections 36 and 37 at one end and similar sections 38 and 39 at the opposite end and the sections 20 connect the upward ends of the bars 36 and 38 on one side and the upper ends of the bars 37 and 39 on the opposite side.

The trigger 22 of the latch is pivotally mounted on a bolt 40 that extends through the upper ends of the sections 36 and 37 of the bars of the lower frame and the spring 23, which retains the trigger in latching relation with the latch 18, is positioned on a bolt 41 that extends upwardly and outwardly from a plate 42 connecting the upper ends of the bars 36 and 37.

The bolt 41 extends through an opening in the trigger 22 and the extended end of the bolt is provided with threads on which a nut 43 is positioned. A washer 44 is also provided on the inner surface of the nut to form a seat for the spring 23. By this means the trigger 22 is urged against the latch 18 and, as the upper frame moves downwardly, the roller 21 rolls over a beveled surface 45 on the end of the latch whereby the latch snaps over the roller when the parts reach the positions shown in Figure 5 with the trigger 22 snapping against the shoulder 46 on the back of the latch. The extended end of the arm 24 of the trigger 22 is provided with an eye 47 in which the trip cord 25 is positioned.

The lower end of the strut 34, which extends from the clevis 33, is provided with spaced openings 48 in which the bolt 49 having washer 50 and a nut 51 thereon is positioned, thereby providing a stop limiting upward movement of the upper frame in relation to the lower frame.

The ends of the lower frame are also provided with diagonally disposed arms 52 and the extended ends of the arms are provided with flanges 53 in which openings for the chains 15 are provided whereby the chains extended from the upper frame are adapted to slide through outer ends of the arms 52 extended from the lower frame. The lower ends of the chains 15 are attached to the backs of the shanks of the hooks by suitable means, such as with eyelets on the hooks and with a clevis or pairs of metal strips connecting the eyelets to ends of the chains. Flanges 54 on the upper ends of the arms 52 are secured to the lower frame with rivets 55 as shown.

Figure 2:
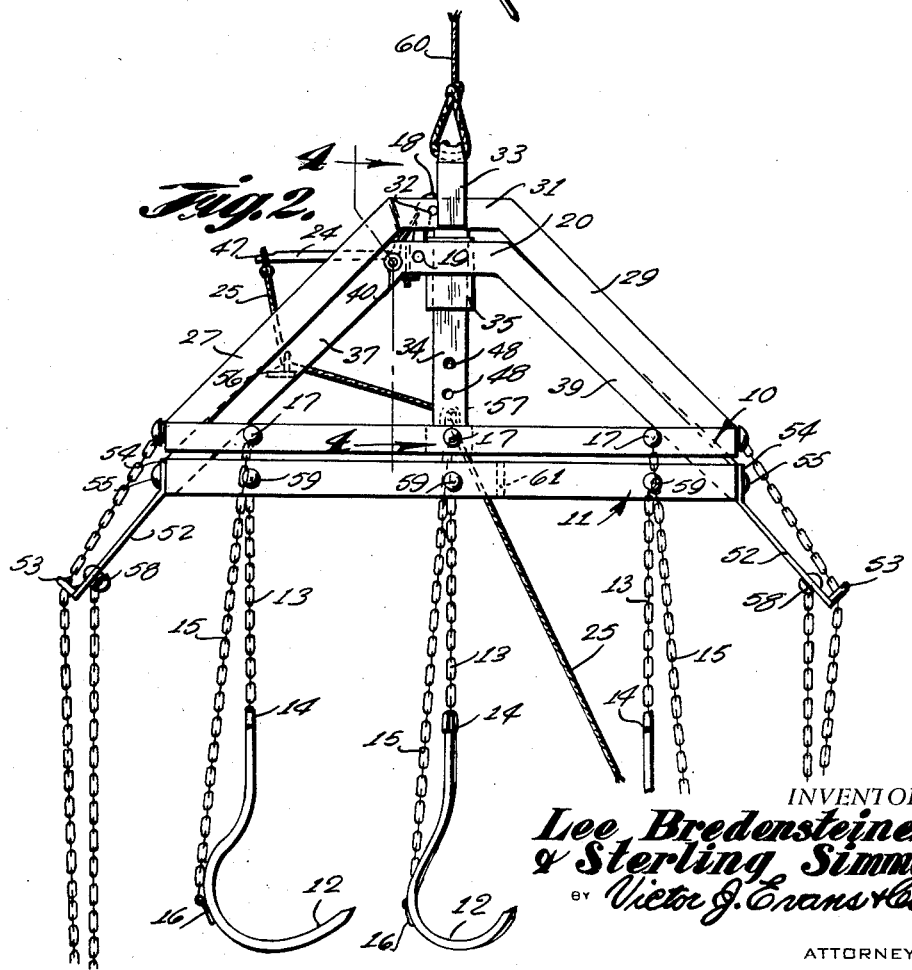
Figure 2 is a side elevational view of the baled hay fork with the parts shown in closed positions.

As illustrated, particularly in Figures 1 and 2, the pull cord 25 extends through eyes 56 and 57 and it will be understood that the eyes may be positioned whereby the ends of the cord may extend to such a position that it may readily be reached when it is desired to release the latch.

The upper ends of the chains 13 are secured to the arms 52 with rivets 58 and to the sides of the frame 11 with similar rivets, as indicated by the numeral 59.

With the clevis 33 secured to a cable 60, the device is adapted to be suspended from the pulley of the barn track carrier whereby with the fork in the outer position, it may readily be lowered so that the hooks 12 may be inserted in bales of hay and with the hooks in the bales the frames 10 and 11 are latched, as illustrated in Figure 5, whereby the frames are secured together with the hooks and bales suspended by the chains 13. The fork may be conveyed over the track carrier until the bales reach a desired position and with the bales in position the pull cord 25 is drawn downwardly thereby releasing the latch so that the frame 11 drops from the frame 10 releasing the tension on the chains 13 and at the same time drawing the backs of the hooks upwardly by the chains 15 whereby bales of hay are free to slide from the hooks.

The lower frame 11 is provided with a reinforcing bar, as indicated by the numeral 61, and it will be understood that the frame and parts thereof may be reinforced with supporting elements as may be desired.

By this means a baled hay fork is provided and with the parts arranged as shown and described as many bales of hay as may be desired may be drawn into position and released by the pull cord 25 which extends from the arm 24 of the trigger of the latch. Although the cord is shown extending through the eyes 56 and 57 on the upper frame, the latch may be released as desired. As illustrated in Figure 1, the eye 56 is positioned on a bar extended between the frame members 36 and 37 of the lower frame and from this eye to the eye 57 on a side member of the upper frame.

It will also be understood that as many hooks as may be desired may be used and should it be desired to carry another bale of hay it is only necessary to attach another hook, with chains to the upper and lower frames, to the device.

It will be understood that modifications, within the scope of the appended claims, may be made in the design and arrangement of the parts without departing from the spirit of the invention.

What is claimed is:

1. A baled hay fork comprising an upper rectangular-shaped frame, a lower rectangular-shaped frame, said lower frame being of the same size as the upper frame, chains suspended from the upper and lower frames, hooks carried by the chains and positioned with shanks thereof connected to chains extended from the lower frame and with backs thereof connected to chains extended from the upper frame, said frames having framework extended upwardly from corners thereof, a strut having a clevis on the upper end extended from the framework of the upper frame through the framework of the lower frame, a latch mounted on the framework of the lower frame and positioned to extend over a roller on the upper frame for retaining the frames with the framework of the lower frame nested in the framework of the upper frame, a trigger pivotally mounted in the framework of the lower frame for urging the latch into engagement with the roller, and a cord extended from the trigger for withdrawing the trigger for manually releasing said latch.

2. In a baled hay fork, the combination which comprises an upper rectangular-shaped frame having side and end members and having a framework with bars extended upwardly and inwardly from corners thereof, a lower rectangular-shaped frame having side and end members and also having a framework extended upwardly from corners thereof, the framework of the lower frame being adapted to nest in the framework of the upper frame, the framework of the lower frame having a vertically disposed sleeve in the upper part thereof, a strut having a clevis on the upper end mounted in the framework of the upper frame and positioned to slide in the sleeve of the lower frame, a latch pivotally mounted in the framework of the lower frame and positioned to engage a roller mounted in the framework of the upper frame, a trigger pivotally mounted in the framework of the lower frame and adapted to retain the latch in the position of locking the frames together, resilient means urging the trigger into the locking position, a pull cord for actuating the trigger to release the latch, chains depending from said frames and hooks positioned with shanks thereof connected to chains depending from the lower frame and with backs thereof connected to chains depending from the upper frame.

3. In a device for handling baled hay, an upper frame, a lower frame, eyes on said lower frame, chains depending from said eyes, hooks connected to said chains, chain members secured to the rear of said hooks and to said upper frame for actuating said hooks, said lower frame including an upper section, a roller on said upper frame, a latch pivotally mounted on said upper section of the upper frame for engagement with said roller, a trigger pivotally mounted on the upper section of the lower frame for retaining said latch in latching position, a spring mounted on the upper section of the lower frame and positioned to engage said trigger for urging the latch into latching relation with the roller, said trigger being provided with an arm, a trip cord connected to said arm, upwardly projecting bars extended from corners of said upper frame, horizontally disposed bars interconnecting said upwardly porjecting bars together, said roller being mounted on a pin extended through said horizontally disposed bars, a clevis secured to said horizontally disposed bars, a strut secured to said horizontally disposed bars and extended downwardly through a sleeve in the upper section of said lower frame, and, a stop member carried by the lower end of the strut depending from the upper frame and positioned to engage the upper section of the lower frame for limiting upward movement of said upper frame, the ends of said lower frame being provided with diagonally disposed arms having flanges provided with openings for the projection therethrough of said chains.

4. A baled hay fork comprising an upper frame, a lower frame, hooks suspended by chains attached to shanks thereof and extended from the lower frame, chains attached to the backs of the hooks with eyelets and strips of material and extended from the upper frame, a vertically disposed strut having a clevis on the upper end carried by the upper frame and extended through the lower frame, a latch mounted on the lower frame and positioned to engage part of the upper frame for retaining the lower frame nested in the upper frame, and a trigger pivotally mounted on the lower frame and positioned to engage the latch for retaining the latch in the position of holding the lower frame nested in the upper frame, said trigger having an arm with a cable depending from the outer end extended therefrom whereby the trigger is actuated by the cable to release the latch permitting the frames to separate with the upper frame traveling in relation to the lower frame, and withdrawing said hooks from bales of hay positioned thereon.

References Cited in the file of this patent

UNITED STATES PATENTS

| | | |
|---|---|---|
| 1,039,737 | Hester | Oct. 1, 1912 |
| 2,100,800 | Ferris | Nov. 30, 1937 |
| 2,569,760 | Hansen et al. | Oct. 2, 1951 |